(12) United States Patent
Messinger

(10) Patent No.: US 10,218,795 B1
(45) Date of Patent: Feb. 26, 2019

(54) REMOTE SENSUAL PROTOCOL/PLATFORM

(71) Applicant: Gal Messinger, Thornhill (CA)

(72) Inventor: Gal Messinger, Thornhill (CA)

( * ) Notice: Subject to any disclaimer, the term of this patent is extended or adjusted under 35 U.S.C. 154(b) by 0 days.

(21) Appl. No.: 15/685,035

(22) Filed: Aug. 24, 2017

(51) Int. Cl.
| | |
|---|---|
| *A61F 5/00* | (2006.01) |
| *H04L 29/08* | (2006.01) |
| *H04W 24/02* | (2009.01) |
| *H04W 12/06* | (2009.01) |
| *H04W 4/38* | (2018.01) |

(52) U.S. Cl.
CPC .......... *H04L 67/125* (2013.01); *H04L 67/025* (2013.01); *H04L 67/16* (2013.01); *H04W 4/38* (2018.02); *H04W 12/06* (2013.01); *H04W 24/02* (2013.01)

(58) Field of Classification Search
CPC .......... H04L 67/125; H04L 67/16; A61F 5/41; A61H 19/00; A61H 19/30; A61H 19/34; A61H 19/40; A61H 19/44
USPC ........................................ 600/38–41; 601/46
See application file for complete search history.

(56) References Cited

U.S. PATENT DOCUMENTS

| | | | |
|---|---|---|---|
| 6,368,268 B1* | 4/2002 | Sandvick | A61H 19/44 600/38 |
| 8,012,082 B1* | 9/2011 | Lefew | A61H 19/00 600/38 |
| 2004/0082831 A1* | 4/2004 | Kobashikawa | A61H 19/34 600/38 |
| 2006/0270897 A1* | 11/2006 | Homer | A61H 19/00 600/38 |
| 2016/0199249 A1* | 7/2016 | Dunham | A61H 19/44 601/15 |

\* cited by examiner

*Primary Examiner* — John Lacyk
(74) *Attorney, Agent, or Firm* — Nasser Ashgriz; UIPatent Inc.

(57) ABSTRACT

The present invention is a remote sensual protocol/platform (RSP/P) to connect humans to other humans or platforms in order to transfer sensual/emotional/sexual stimulation and responses, in a universal way. The RSP/P connects any connected device, sensor or actuator to other connected device, as long as these devices are able to operate remotely and can also connect to the RSP/P platform. The present invention enables the user to focus on pleasure which happens in the right side of the brain instead of logical thinking which happens in the left side of the brain to interfere with the pleasure. The RSP/P is a distributed system which can operate in a variety of modes and offer different services.

16 Claims, 10 Drawing Sheets

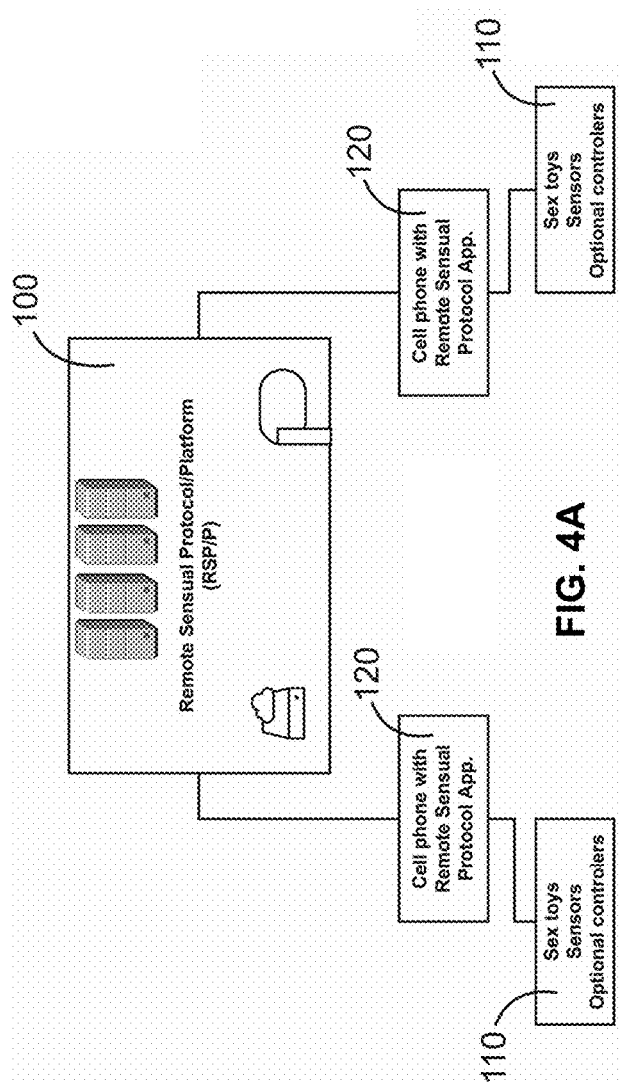
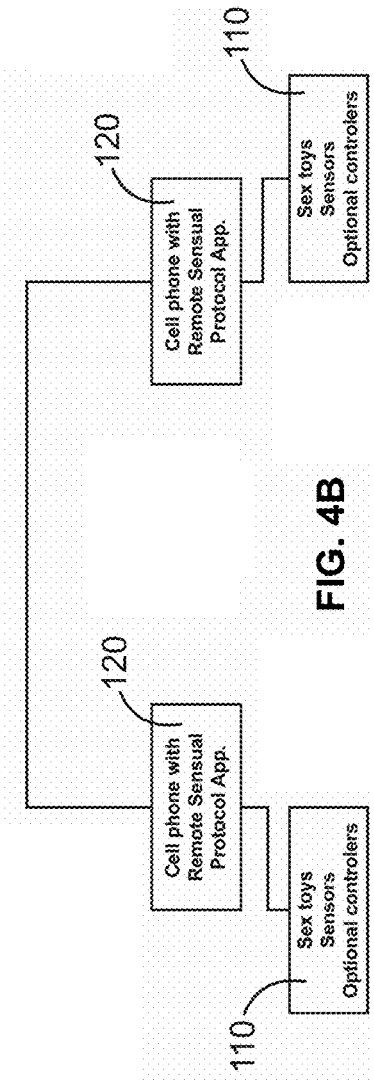
FIG. 4A
FIG. 4B

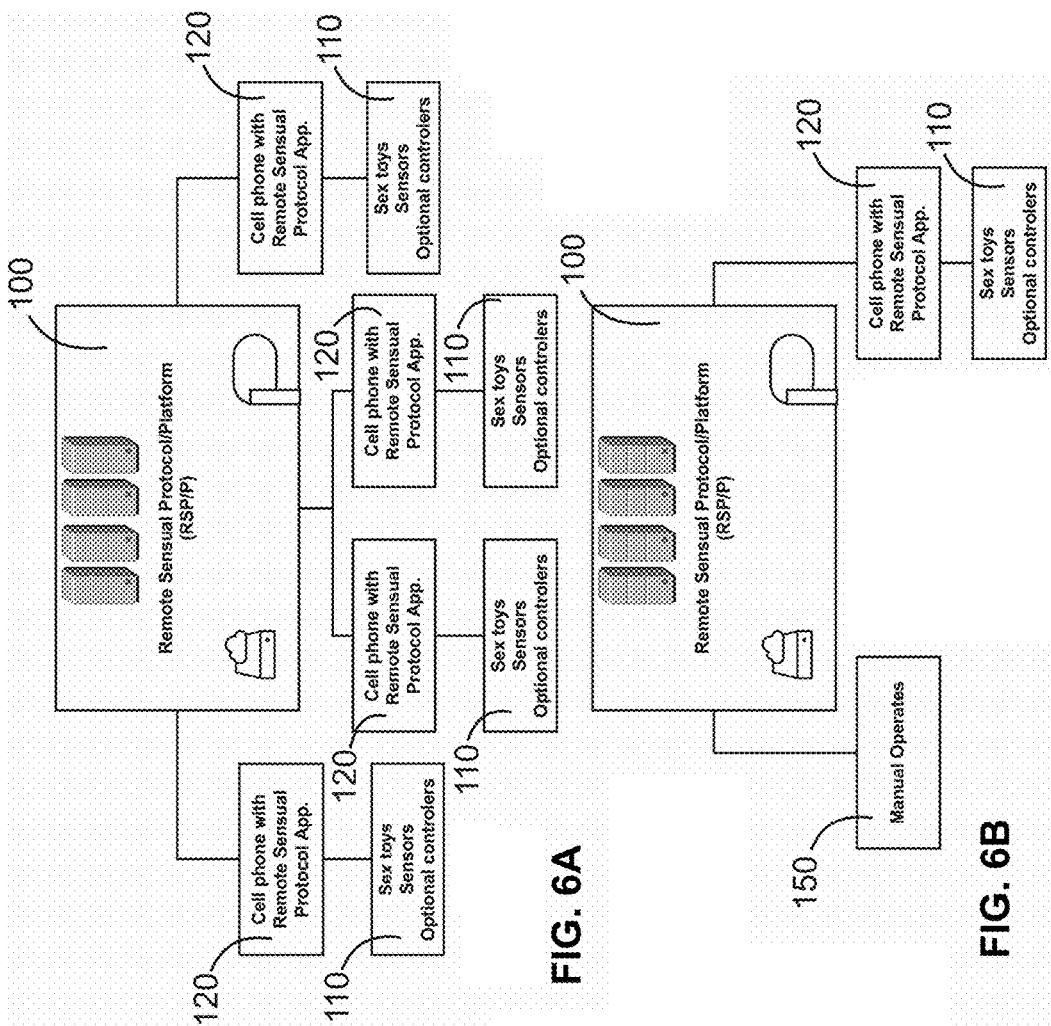

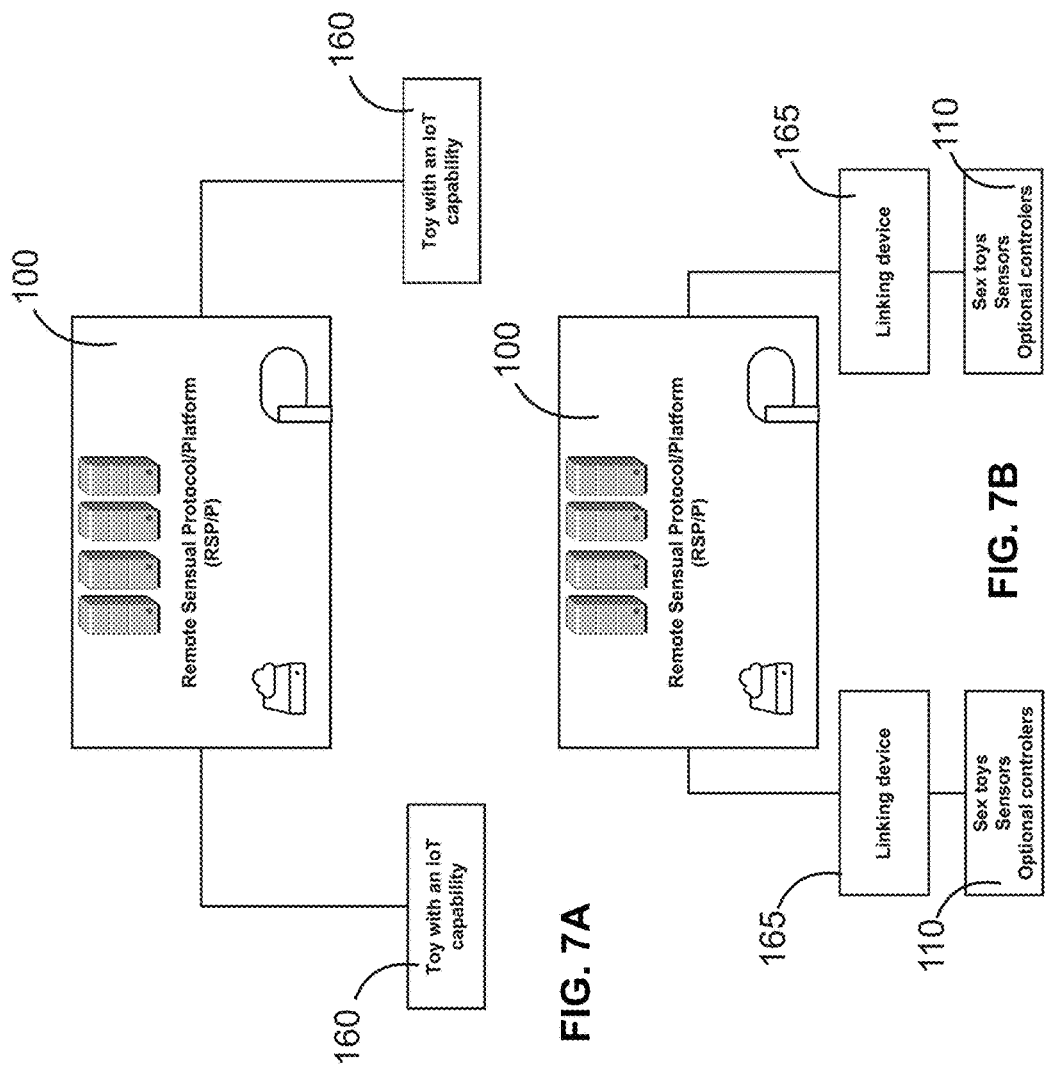

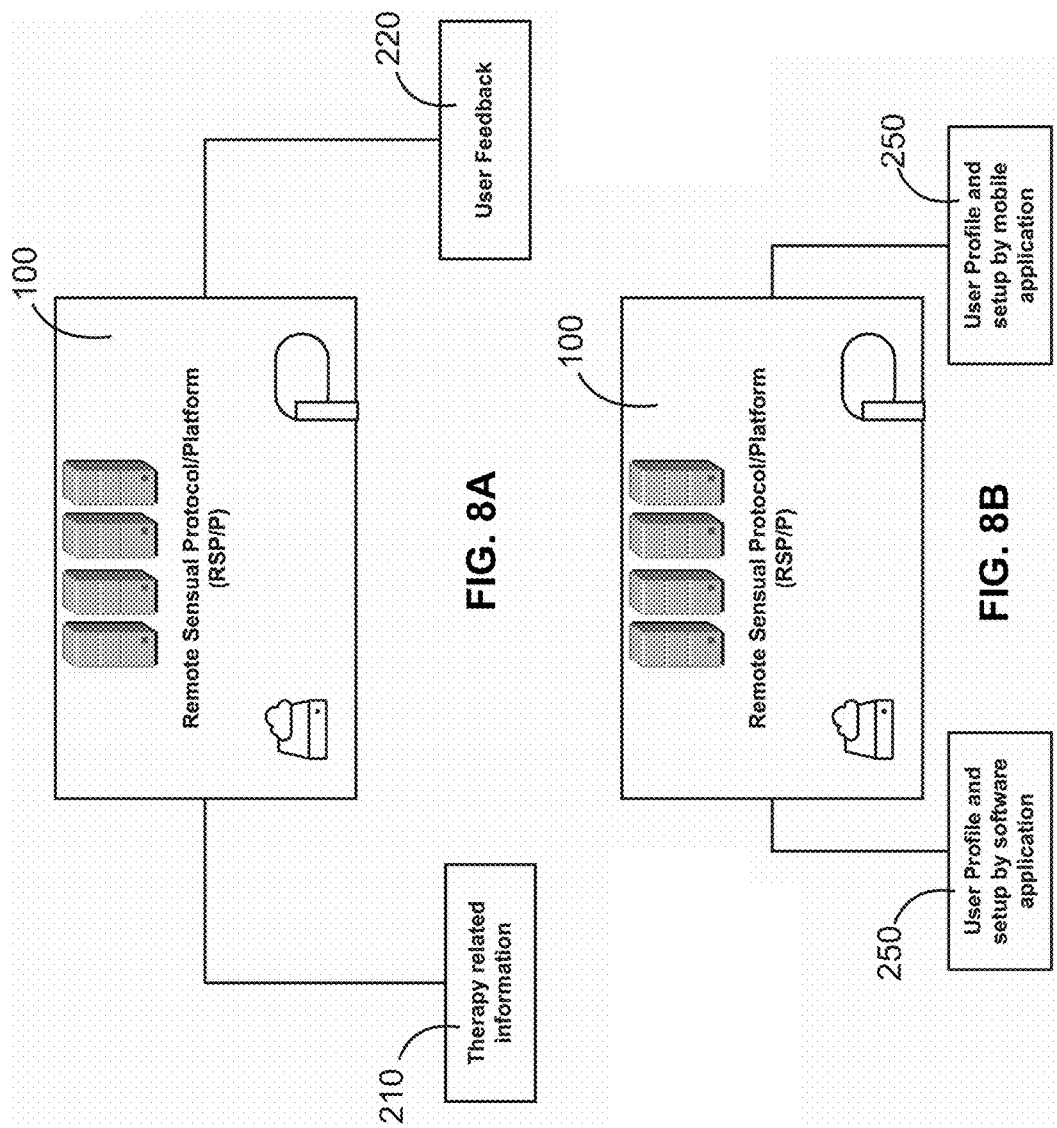

REMOTE SENSUAL PROTOCOL/PLATFORM

FIELD OF THE INVENTION

The present invention relates generally to a computer platform and especially to a remote sensual platform for pleasure in sex toy industry and other related industries.

BACKGROUND OF THE INVENTION

There are numerous methods of communication, including telephone, email, and social media websites. However, there is no universal protocol/platform that is dedicated to sensual/sexual communication between people (Individuals, couples or groups) or entities/platforms. The present invention is aimed at providing a universal platform for all entities/platforms, such service industries (e.g., therapists, dating platforms, or erotic phone/video services), media (e.g., movie industry), multimedia (e.g., gaming industry, virtual reality), or computers (e.g., Artificial Intelligence or other software), to have a sensual/sexual communication with each other.

There are many pleasure devices, such as vibrators, sex toys and sex dolls. However, only a very few of them can communicate with the outside world in the form of applications or specific connection to each other. Even, the prior art devices that can communicate are limited to simple connections between the same product/manufacturer. There is no universal protocol/platform, which enables current sensual devices to communicate with any other device or media. And, there is no universal protocol/platform that allows a "sensual conversation" or "sensual interactive connection" or "sensual stimuli by an A.I." for sex toys and other pleasure devices.

In addition, the current devices on the market do not have a common knowledge base and data center. Therefore, the end user's experience cannot be optimized.

Therefore, there is a need for a universal protocol/platform in order to handle emotional/sensual/sexual communications. This protocol should handle different devices and media, as well as different users.

SUMMARY OF THE INVENTION

The present invention is a remote sensual protocol/platform to connect a first entity to a second entity for a sexual/sensual activity by a plurality of connected devices. It comprises of a plurality of computer-programs for different tasks. The computer-programs are described as below:

(i) A detecting and pairing computer-program to detect and pair a plurality of connected devices with a remote sensual protocol/platform. The remote sensual protocol/platform detects any connected devices and pairs them with the protocol of the present invention. The operation of the connected devices is activated by the protocol/platform of the present invention.

(ii) A monitoring computer-program to monitor emotional-, sensual-, sexual- and/or bio-feedbacks of the first entity and the second entity from a plurality of monitoring means during the sexual activity. The monitoring computer-program provides the necessary data to the other computer-programs to analyze the entity's behavior before, during or even after the sexual activity. The gathered data can be used by the present platform to optimize the operation of the connected devices.

(iii) A storing computer-program to store the emotional-, sensual-, sexual- and/or bio-feedbacks. The storing computer-program can be a physical hard drive in a server or a cloud storage.

(iv) An analyzing computer-program to analyze the emotional-, sensual-, sexual- and/or bio-feedbacks. The analyzing computer-program analyzes the changes in each parameter of each sector that is being monitored during the sexual activity. Changes in the parameters in each sector are pre-described by the present invention to a specific action/operation/activation of the sensors, actuators or any specific element in the connected devices.

(v) An optimizing computer-program to optimize the emotional-, sensual-, sexual- and/or bio-feedbacks. The optimizing computer-program optimizes the operation of the same connected devices in their parameters by the entity's experience during the sexual activity. The optimizing computer-program makes sure that the entity's satisfaction is reached during the sexual activity. If there are some issues or concerns, the entity can provide them to the present invention platform by a detailed questionnaire after the sexual activity. The optimizing computer-program optimizes the operation of the sensors, actuators or parts of the connected devices based on the questionnaire.

(vi) A translating computer program to translate the commands and sensor activities from one device or platform to another device or platform. The simplest example is the connection of two sex toys from different manufacturers. Another example is connecting a sex toy to a manual operator of an erotic service. This translation can use the full power of the RSP/P system (online mode) or a lower version of setup (standalone mode).

(vii) A communication computer-program to communicate between the entities. The entities can communicate before, during or after the sexual activity by the communication computer-program. The information during the communication between the two entities can be used by the optimizing computer-program or/and translating computer-program to maximize the entity's satisfaction for the next sexual activity. It can also be done during the sexual activity, depending on the application.

(viii) A commanding computer-program to command the connected devices during the sexual activity. The commanding computer-program can change the operation of the connected devices during the sexual operation by each one of the entities, based on the entity's preferences.

(ix) A controlling and adjusting computer-program to control and adjust the operation of the connected devices based on the optimizing computer-program and translating computer-program during the sexual activity.

The optimizing computer-program of the present invention optimizes the responses of the platform according to various parameters and creates the best stimuli to the entity. The present invention, in its broadest concept, can analyze the emotional/sensual/sexual state of the entity, and perform the followings:

- enable the entity to focus on pleasure (the right side of the brain);
- optimize the experience of the entity, by maximizing pleasure;
- optimize the connection with another entity, by maximizing mutual pleasure;
- store a log that will be used as a profile of the entity; and
- analyze the log and give a feedback report to the entity and/or a therapist.

The remote sensual protocol/platform (RSP/P) enables the entity to focus on pleasure, which happens on the right side of the brain, instead of logical thinking, which happens on the left side of the brain, which might interfere with pleasure.

The present invention is a universal protocol/platform that enables communication of any sensual device to any another device, such as another sensual device, A.I., video game or media (which use the universal protocol). This protocol includes communication with operational functions, sensors and feedback, optional information log, as well as other definitions and signals. The algorithm behind the protocol will be able to connect two users; a group of users; a user to recorded media (a movie, recorded activity with a celebrity etc.); a user to interactive media (video games, virtual reality, social media, etc.); dating websites; virtual reality websites; user to a therapist, and erotic call centers (voice and/or video).

The present invention automates the remote operation of pleasure devices without the need for extensive entity intervention. This will make the entity's experience free of logical thinking and focused on pleasure. This will make the right side of the brain excited, while the left side of the brain will have minimal activity.

The present invention includes handling of different devices, platforms and media, by keeping a log of each of their functions and translating them to a generic protocol. This protocol will be used by the RSP/P system in order to interact with other devices, platforms and media.

The monitoring and controlling and adjusting computer-programs of the present invention analyze the emotional/sensual/sexual state of the user by using automated and optional voluntary inputs. Automated inputs could be: motion, body temperature, sound, humidity, heartbeat, blood oxygen, blood pressure and more. The optional voluntary inputs could be: voice commands, pressure operates, push buttons, sliders, key pads etc.

The protocol/algorithm of the present invention has a multi-way feedback and adjustment capability, enabling the control of the inputs and the outputs by both sides, if used between two users or more. This will solve the problem of different interaction styles between users.

The Remote Sensual Protocol/Platform (RSP/P) enables all the necessary inputs and outputs to operate sensual devices such as vibrators, sex toys, sex dolls, sex robots and any pleasure giving devices, as well as optional sensors, actuators, voice commands and voice feedback. The RSP/P further provides multiple feedback algorithms, enabling the adjustment of any feature automatically. The RSP/P can be personalized (i.e. profiling by the user and/or by operational log and analytical algorithms). The feedback and personalization allows the optimization of the usage of any pleasure giving device, sensor or actuator. It will also overcome physical or mental limitation of the users (for example, amplifying or reducing the thrust according to personal preferences, but will still maintain the nature of the action giving by the other party).

The present invention can help people with disabilities and be a valuable tool for therapists and other service providers.

There is a problem with the un-natural way people feel about remote sex, mainly because of the need to handle technology. This causes the usage of logical thinking (left side of the brain). This logical thinking interferes with the pleasure process, which happens in the right side of the brain. The present invention solves mentioned problem.

One of the objectives of the present invention is to provide a universal protocol/platform for sensual devices.

Another objective of the present invention is to integrate the knowledge of human sensual behavior into a pleasure giving platform using a sensual remote protocol. Emotional communication which is related to sexual/sensual activity, optimized by an algorithm and transferred via technology in a universal way is a new concept.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

FIG. 4A shows a schematic diagram of the standalone mode for the remote sensual protocol/platform of the present invention;

FIG. 4B shows a schematic diagram of the standalone mode for the remote sensual protocol/platform of the present invention;

FIG. 6A shows a schematic diagram of the additional mode for the remote sensual protocol/platform of the present invention;

FIG. 6B shows a schematic diagram of the additional mode for the remote sensual protocol/platform of the present invention;

FIG. 7A shows a schematic diagram of the IoT mode for the remote sensual protocol/platform of the present invention;

FIG. 7B shows a schematic diagram of the IoT mode for the remote sensual protocol/platform of the present invention;

FIG. 8A shows a schematic diagram of the feedback and therapy for the remote sensual protocol/platform of the present invention;

FIG. 8B shows a schematic diagram of the feedback and therapy for the remote sensual protocol/platform of the present invention;

DETAILED DESCRIPTION OF PREFERRED EMBODIMENTS

The figures are not intended to be exhaustive or to limit the present invention to the precise form disclosed. It should be understood that the invention can be practiced with modification and alteration, and that the disclosed technology be limited only by the claims and equivalents thereof.

The technology disclosed herein, in accordance with one or more various embodiments, is described in detail with reference to the following figures. The drawings are provided for purposes of illustration only and merely depict typical or example embodiments of the disclosed technology. These figures are provided to facilitate the reader's understanding of the disclosed technology and shall not be considered limiting of the breadth, scope, or applicability thereof. It should be noted that for clarity and ease of illustration these figures are not necessarily made to scale.

Figure 1:
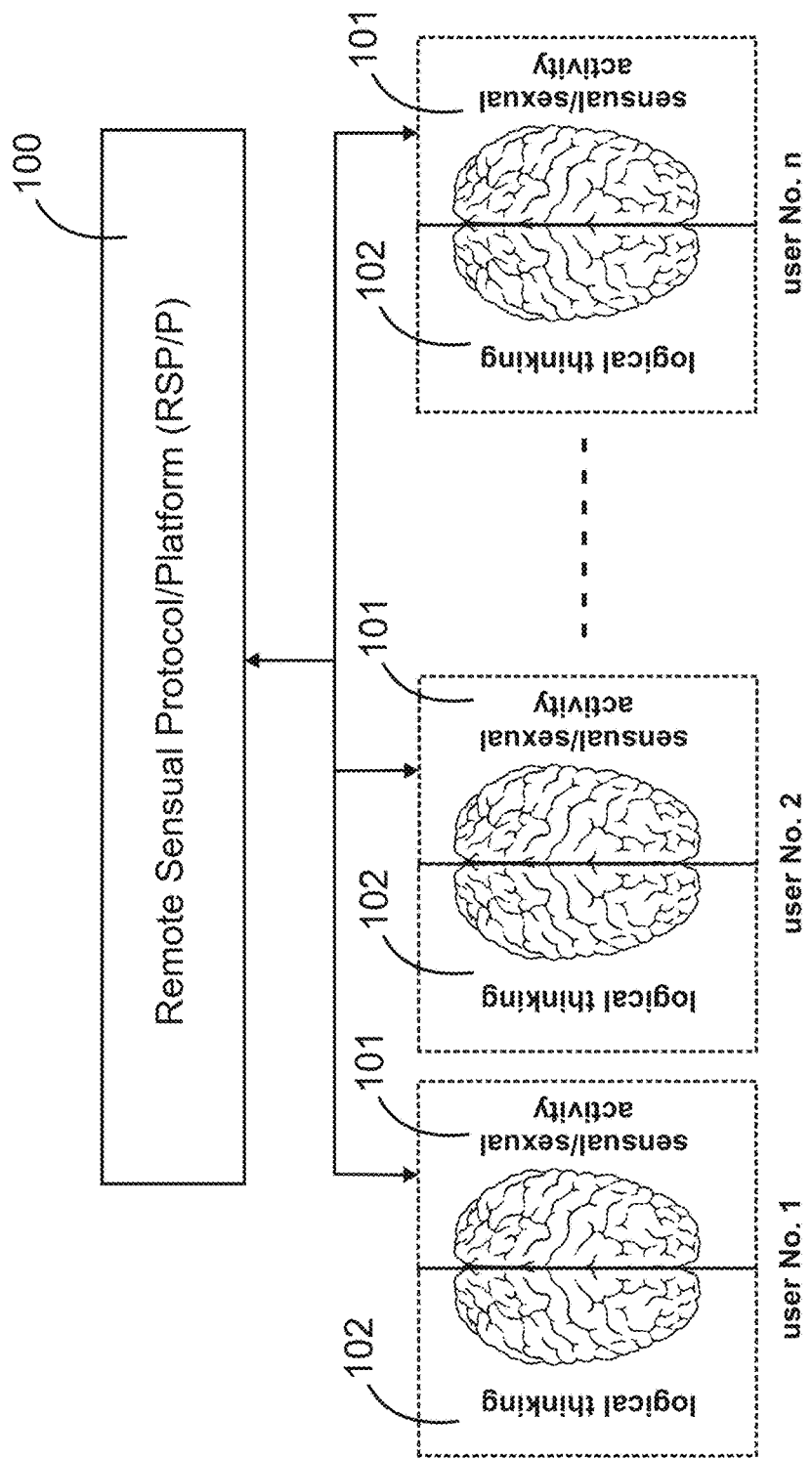
FIG. 1 shows a schematic diagram of the remote sensual protocol/platform of the present invention.

As shown in FIG. 1, when using Remote Sensual Protocol/Platform (RSP/P) 100 of the present invention in a sexual activity, the user(s) (user no. 1 to user no. n) focuses on the pleasure which handles on right side of the brain 101. This means that the user(s) will not deal with setup and operations (which require logical thinking which handle on left side of the brain 102) while using RSP/P 100. The RSP/P 100 makes the operation of sex-toys, sensors, media, gaming etc., transparent and effortless, as if the actions are natural and the technology involved is invisible.

The optimizing computer-program of the RSP/P 100 is also responsible for optimizing the individual's pleasure by adjusting each function. The user can manually input some information throughout a questionnaire into the platform (manual profiling, prior to usage of the platform and devices) to express his/her expectation during the sexual activity. The platform also collects data during the sexual activity and uses the collected data for optimization for the maximum pleasure. Each function is tailored to the user by the protocol's algorithms.

Since the RSP/P 100 learns about the user(s) during the sexual activity, the information gathered can be used for: giving feedback to the user, helping in therapy session and collect generic information for big data analysis to help other individuals or groups.

Figure 2:
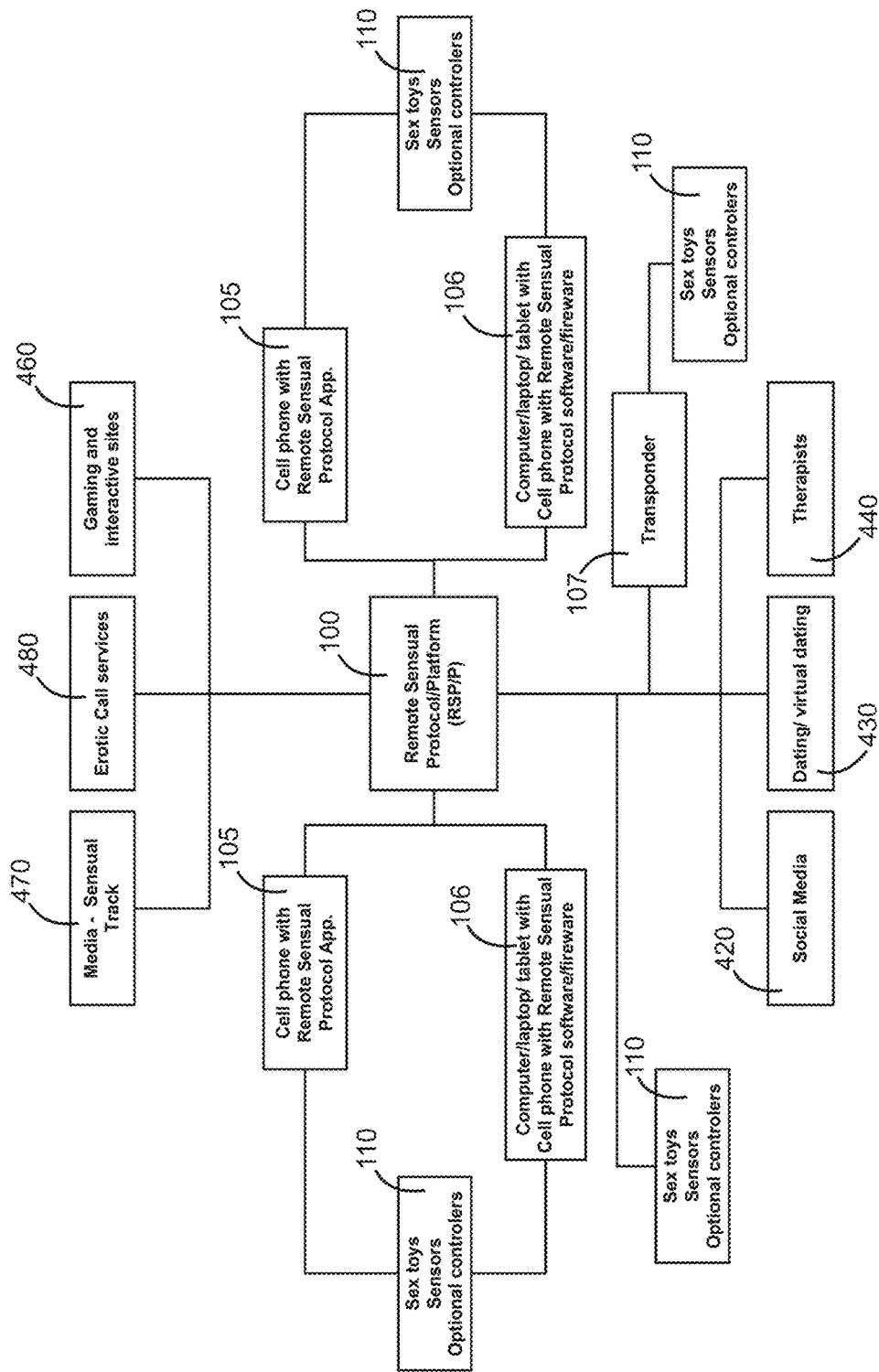
FIG. 2 shows a schematic diagram of the connection of all entities with the remote sensual protocol/platform of the present invention.

As shown in FIG. 2, the RSP/P 100 enables any connected devices (smart devices), sensors or platforms, which possess the capability to be activated remotely to connect to other devices and platforms. The communication is done mostly via the internet or via other connection means.

The platform 100 are located in the platform's servers with an optional cell phone 105, an optional computer 106, an optional laptop or tablet, an optional IoT device 110, an optional transponder 107, etc.

The RSP/P 100 can also interact with other platforms, such as: social media 420, dating platforms 430, match making platforms, virtual dating platforms, virtual reality platforms, medical platforms (for therapy) 440, gaming platforms 460, erotic services (call/video/interactive) 470, 480, media content sites and more.

These optional links depend on third party to use the present platform 100. The third party must agree to cooperate and have the will and ability to integrate or communicate with the RSP/P 100.

Unlike regular social media platforms, which deal with transferring information, the Remote Sensual Protocol/Platform (RSP/P) 100 deals with higher scope of operations, which includes connecting different devices and/or platforms together in a universal way. The RSP/P 100 takes care of hardware devices as well as sensors and actuators, user setup and profiling, and accumulated personal and generic data, by using algorithms and/or A.I. This involves a massive usage of technology, which should act seamless and be transparent to the user, in order to involve only the right side of the brain.

Figure 3:
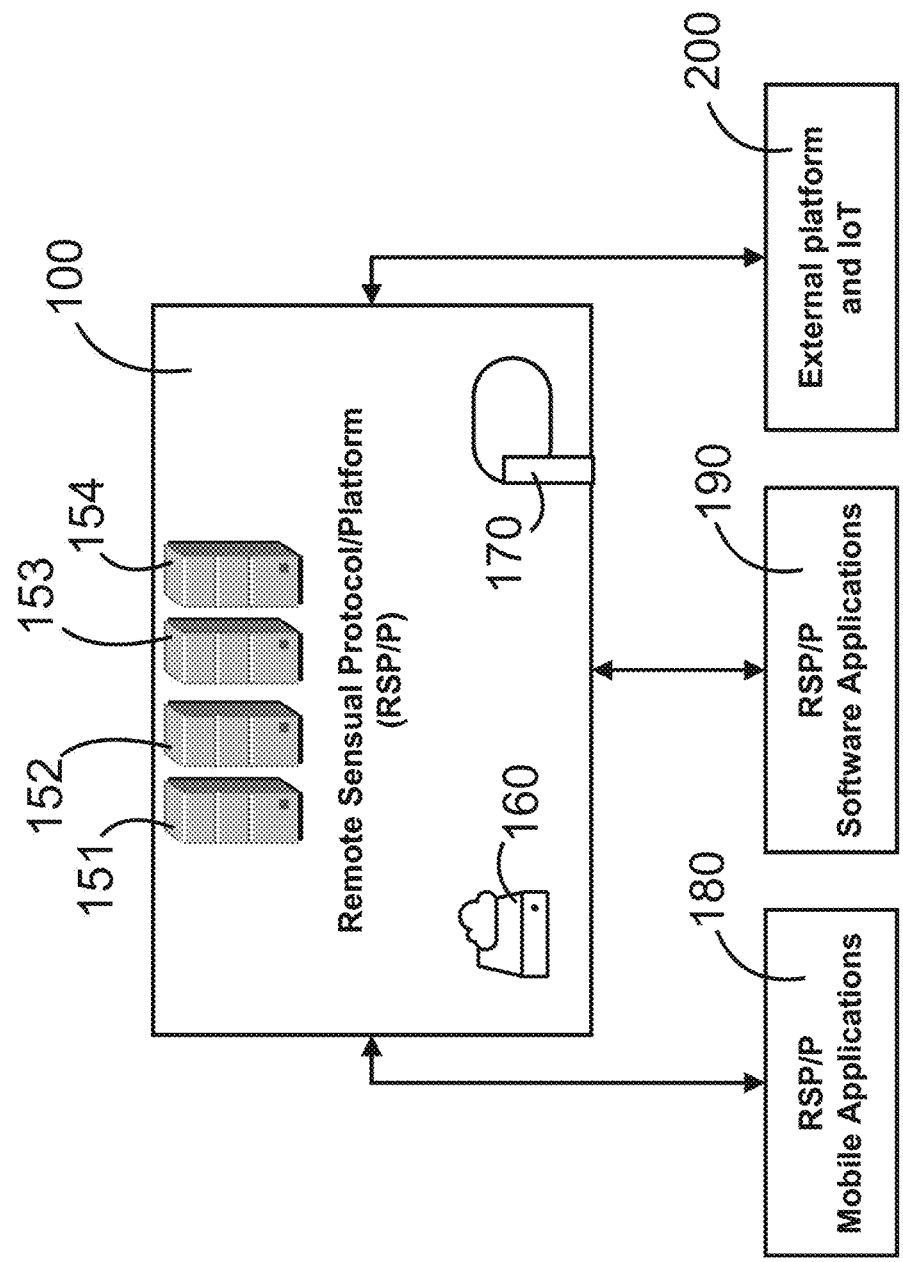
FIG. 3 shows a schematic diagram of the basics of the remote sensual protocol/platform of the present invention.

FIG. 3 shows the RSP/P 100 basic concept. The core of the platform 100 has a plurality of server arrays 151-154 which has a database 160, internet connection 170 and a variety of computer-programs and algorithms.

The servers 151-154 (any number of servers may be used) comprises of the services needed to connect the user's devices, the conversation, operation algorithms and computer-programs and artificial intelligence. The database 160 comprises of the user's profile, activity analysis and activity feedback information, as well as device operation tables and all the information necessary for the system.

The phone application 180 and software application 190 comprise of the user interface, external device and sensor interfaces, as well as the stand alone and remote operation software. An external device 200 interfaces with the present platform 100 directly without a phone or a computer. Examples of the external device 200 are IoT devices, media and stand-alone sex toys, call services and more.

One element of the present platform 100 is the cell phone application (app) 180. A dedicated part of the RSP/P 100 will be installed in the cell phone. The app 180 enables a few operational modes. For example, a stand-alone mode and an online modes. Another element could be a software application 190 and user interface, installed on a computer, laptop or tablet. The software will usually have an enhanced mode of the cell-phone version.

The app 180 and the software 190 can communicate with a sex-toy, sensors and actuators, as well as giving feedback, information and enable user profiling. The IoT 200 referees to any sex-toy, sensor or actuator which has an IoT capability. The platform 200 refers to any platform which communicates or integrated with the RSP/P 100.

The main computer-programs in the servers comprises of a detecting and pairing computer-program implemented to detect and pair the plurality of connected devices with the remote sensual protocol/platform. The remote sensual protocol/platform detects any connected devices and pairs them with the protocol of the present invention. The operation of the connected devices is activated by the protocol/platform of the present invention.

The present invention further comprises of a monitoring computer-program implemented to monitor an emotional-, a sensual-, a sexual- and/or a bio-feedbacks of the first entity and the second entity from a plurality of monitoring means during the sexual activity. The monitoring computer-program provides necessary data for the other computer-programs to analyze the entity behavior before, during or even after the sexual activity. The gathered data can be used by the present invention platform to optimize the operation of the connected devices.

The present invention further comprises of a storing computer-program implemented to store the emotional-, sensual-, sexual- and/or bio-feedbacks. The storing computer-program can be a physical hard drives in the present invention servers or a cloud storage provided by a third party from different websites or platforms.

The present invention further comprises of an analyzing computer-program implemented to analyze the emotional-, sensual-, sexual- and/or bio-feedbacks. The analyzing computer-program analyzes the changes in each sector which the present invention platform can monitor during the sexual activity. Changes in these parameters in each sector can be defined by the present invention to a specific action/operation/activation of the sensors, actuators or parts in the connected devices.

The present invention further comprises of an optimizing computer-program implemented to optimize the emotional-, sensual-, sexual- and/or bio-feedbacks. The optimizing computer-program optimizes the operation of the same connected devices in their parameters by the entity experience after the sexual activity. The optimizing computer-program makes sure the entity satisfaction is reached during the sexual activity. If there are some issues or concerns, the entity can provide them to the present invention platform by a detailed questionnaire after the sexual activity. The optimizing computer-program optimizes the operation of the sensors, actuators or parts of the connected devices based on the questionnaire.

The present invention further comprises of a translating computer-program implemented to translate the result of the optimization of the optimizing computer-program into a generic protocol which functions the connected devices. The translating computer-program actively updates the data from the optimizing computer-program to change the parameters of the connected devices.

The present invention further comprises of a communicating computer-program implemented to communicate between the entities. The entities can communicate before, during or after the sexual activity by the communicating computer-program. The information during the communication between two entities can be used by the optimizing computer-program or/and translating computer-program to maximize entity satisfaction for the next sexual activity.

The present invention further comprises of a commanding computer-program implemented to command the connected devices during the sexual activity. The commanding computer-program can change the operation of the connected devices during the sexual operation by each one of the entity based on the entity preferences.

The present invention further comprises of a controlling and adjusting computer-program implemented to control and adjust operation of the connected devices based on the optimizing computer-program and translating computer-program during the sexual activity.

The remote sensual protocol/platform (RSP/P) enables the entity to focus on pleasure which happens in the right side of the brain instead of logical thinking which happens in the left side of the brain which interferes with the pleasure.

FIGS. 4A and 4B show RSP/P standalone mode in the present invention. The standalone mode of the RSP/P 100 will be installed in a cell phone, PC, or tablet 120, and will be able to communicate with other devices which have the RSP/P software or application as well as the RSP/P server/A.I.

In the standalone mode, the devices 110 will first communicate with the RSP/P 100 and download parameters, and other components into cell phone apps or software 120 (which is installed on a PC, laptop or tablet) (FIG. 4A). This means that each device, sensor or control 110 will be translated by the RSP/P 110 to a generic protocol which will be understood by the apps 120 thus enabling a seamless operation. The RSP/P 110 will also transfer any profiling information and other relevant data.

The second phase will be a direct connection between the apps or software 120 (FIG. 4B). In this case there is no third party connecting the devices 110, enabling a private connection. This mode is important to persons who would like to have maximum privacy.

Figures 5A, 5B:
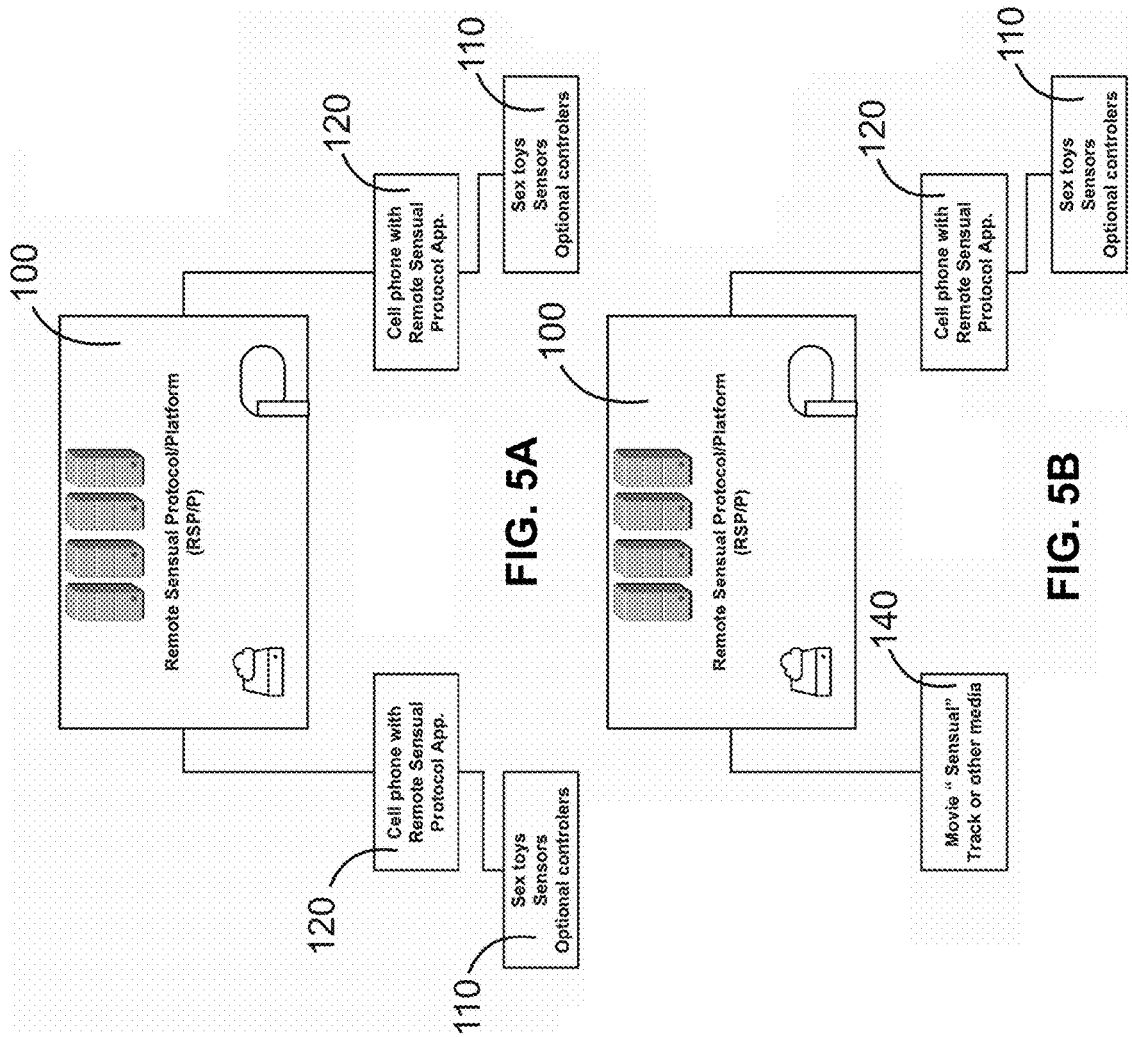
FIG. 5A shows a schematic diagram of the online mode for the remote sensual protocol/platform of the present invention.
FIG. 5B shows a schematic diagram of the online mode for the remote sensual protocol/platform of the present invention.

FIGS. 5A and 5B show RSP/P online mode. As mentioned, the RSP/P 100 is a distributed system and will have parts of it installed in apps 120, software or integrated into devices 110.

In the online mode, the communication will be through the RSP/P server/A.I. 100. When two users are connected online (FIG. 5A) they will enjoy the full power of the RSP/P 100. The server will have access to all the users' information (after getting the users' approval), as well as other information. The server will also have a full version of the RSP/P 100, which will include algorithms (A.I.) and services.

Another example of connection is between a user and media (FIG. 5B), for example a 'sensual track' 140 which will be incorporated onto a movie. This 'sensual track' 140 can activate a sex-toy or a similar device 110 in order to give the user another dimension of excitement. The media shown here is just one example. Gaming, virtual dating, and other platforms (as shown in FIG. 2), could act as the media which excite the user. This invention is a universal bridging platform between media platforms.

FIGS. 6A and 6B show RSP/P additional modes. The RSP/P will be evolving all the time. The present invention focuses on a general platform/protocol for all users, modes, devices, sensors and platforms. In FIGS. 6A and 6B, two more modes are described.

As shown in FIG. 6A, an additional usage for the RSP/P could be group sessions, in which multiple users can be connected simultaneity. The RSP/P 100 will coordinate the activity, while enabling a private connection to each user's identity. This connection will take into consideration each user's profile, which is stored in the system, as well as on going inputs.

As shown in FIG. 6B, a manual operation 150 could be used when one side is not using a sex-toy or similar device 110, while the other side does. Some usages for manual operation can be:
 when one side is limited physically (i.e. persons with disability);
 one side (which usually operates the manual operates) is a therapist;
 one side is an erotic call operator, and
 any case where one side cannot, or does not want to use sex-toys and/or sensors.

FIGS. 7A and 7B show RSP/P IoT modes. With the growth in field of the 'Internet of Things' (IoT) the RSP/P 100 will support all the devices, sensors and platforms that are IoT capable, upon approval and cooperation of the manufacturers and end users. As shown in FIG. 7A, when a sex-toy, sensor or control has IoT capability 160 the connection to the RSP/P 100 can be direct. As shown in FIG. 7B, when there is no IoT capability, a sex-toy, sensors and controllers 110 could be connected through a linking device 165 to the RSP/P server/A.I. 100. A combination of an IoT device and a linking device is another possibility.

FIGS. 8A and 8B show RSP/P Feedback and therapy. The RSP/P 100 can be used as a feedback and therapy tool. As shown in FIG. 8A, a therapist can retrieve information 210 from the system, by using a dedicated therapy version of the RSP/P 100. As shown in FIG. 8B, the information can include the users' activity log, as well as the users' partner 250. All this activity will be released only with authenticated authorization by the user/s.

Each user can enter and edit their profile on the platform 100. This means that the user can have the setup done prior to the activity. This is an important aspect because a setup calls for a lot of logical thinking, while enjoying a sexual/sensual activity requires the emotional side of the brain to work at its best, without the need to use logical thinking.

Figure 9:
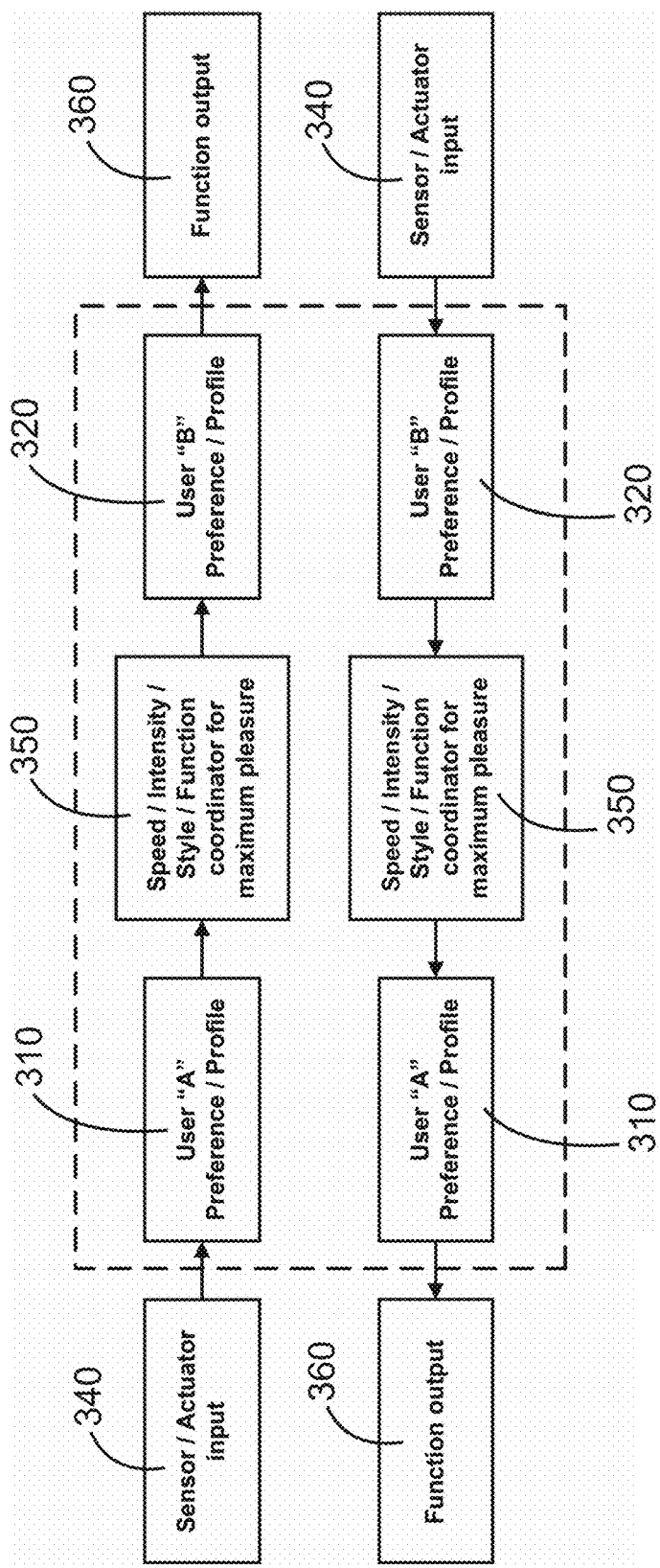
FIG. 9 shows a schematic diagram of the multiple feedbacks for the remote sensual protocol/platform of the present invention.

FIG. 9 shows RSP/P Multiple feedback in the present invention. This multiple feedback implementation is an integral part of the invention and serves as a unique way of communication between remote sensual/sexual users 310, 320. Since each user 310, 320 is different, the RSP/P will be able to adjust each function 350 in order to optimize the pleasure of the users.

Again as shown in FIG. 9, the RSP/P enables a multiple feedback for each function 350. Each function 350, for example the thrust strength will be optimized by both users 310, 320, in both inputs 340 and outputs 360. This 4-way feedback will maximize the pleasure of both users 310, 320. The information from the feedback setup and actions can be used for giving feedback to the user/s and for therapy purposes. This multiple feedback implementation is an integral part of the invention and serves as a universal way of communication between remote sensual/sexual users.

Figure 10:
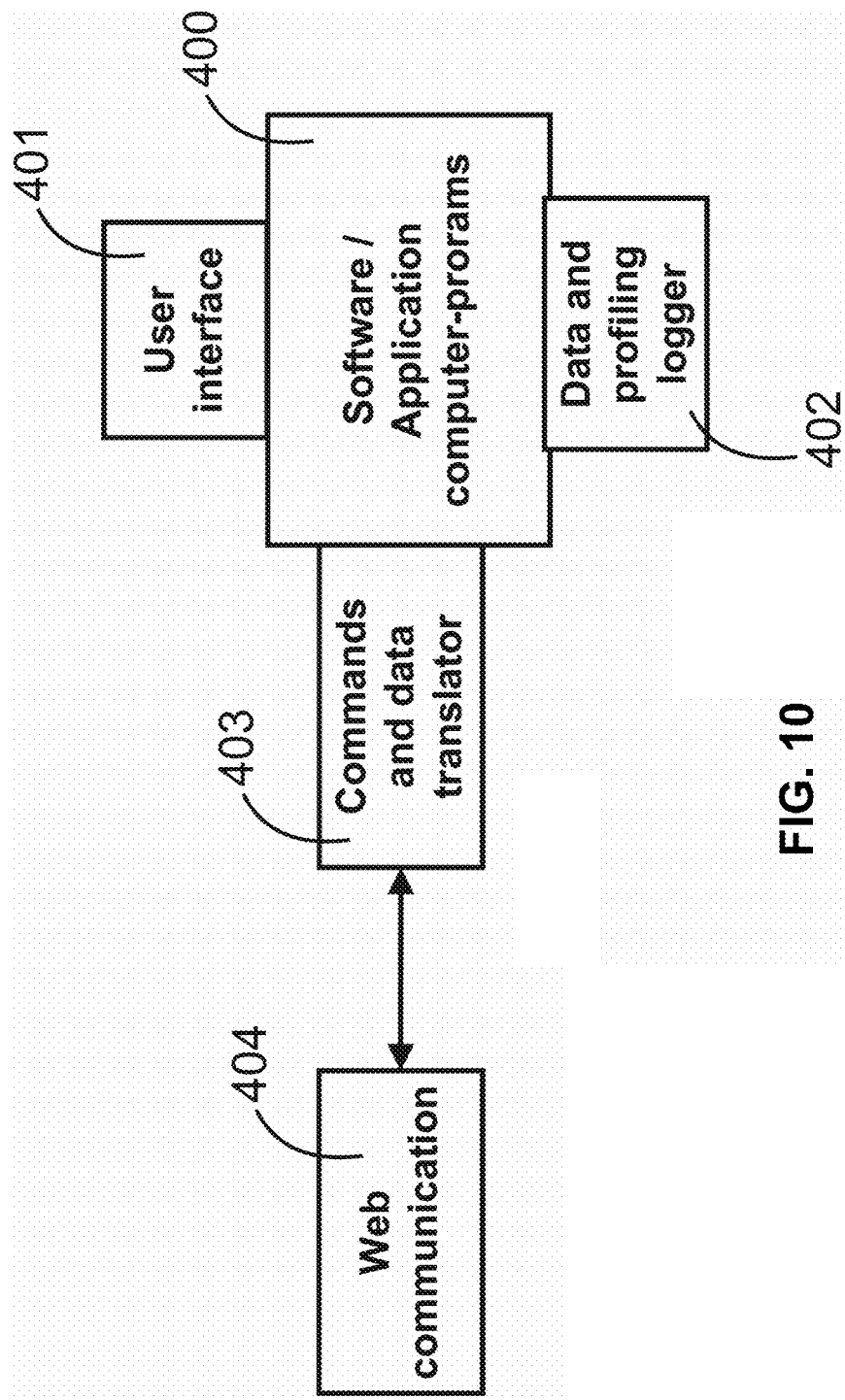
FIG. 10 shows a schematic diagram of the basics of the software elements for the remote sensual protocol/platform of the present invention.

FIG. 10 shows RSP/P software/A.I. elements of the present invention. For example, if it is the main server, the software and its elements will be accessed by developer or maintenance personnel and will give service to many users. If it is a client, it may be a cell phone application or lap top software.

the main software/app 400 contains the necessary A.I. and/or algorithms which operate the entire system;

a user interface 401, which will communicate with the user (for example a sex-toy user, a therapist, a maintenance personnel etc.);

the data logger 402 will be a data base which handle all the data necessary for the system. This will include the clients' profile data and activity, statistical data and other data;

the commands and data translator 403 will translate any command form remotely operated sex-toys, sensors and actuators to the systems' protocol. This will enable the A.I./algorithms to work with one 'linguistic set' instead of many, and the web communication 404 will enable each instance of the software to communicate with the outside world (i.e. the Internet).

The RSP/P can connect to optional operational devices. The RSP/P will enable the usage of a verity of sex-toys, vibrators, sex-dolls, sensors, actuators, warble sensors, input devices and voice commands. The beauty of this idea is that the RSP/P can optimize a vast combination of the above, from simple a set-up to a very complicated one.

For clarification purposes, some operational examples of the present invention are provided.

Two users, each having a sex toy, can be connected to the RSP/P. One user can send an invitation request to a specific connection. They login into the platform's server. The platform detects the sex toys (for example dildo shaped and a vagina shaped devices) and pairs them with the remote sensual protocol/platform. These devices can be generic and/or from different manufacturers.

The platform monitors bio-feedbacks of the users from a plurality of monitoring means such as a smart watch during the sexual activity. The platform stores the bio-feedbacks info. It then analyzes and optimizes the bio-feedbacks by measuring the output of the sensors and/or by feedbacks provided by the users (such as voice commands, or changes in the setting of the device, like vibration frequency of the devices). The system quantifies the data into useful parameters, such as frequency, patterns, thrust, etc. The optimization is performed by comparing the biofeedback data, such as heart rate, with device parameters, such as vibration frequency.

The platform uses the quantized data in order to translate the bio-feedbacks into a generic protocol, which functions the connected devices. For example increase in pleasure sounds will increase the thrust amplitude or create a different pattern. The users can communicate by communicating computer-program during the sexual activity; this may include direct voice commands, setup changes or indirect reaction to the user's voice.

The platform commands the connected devices. The commands are tailored to each device. For example some devices have three functions and others more function. The RSP/P will reflect the optimal momentary setup for maximum pleasure for both users. For example one user will need an increase of thrust, while the other will enjoy a constant or patterned thrust.

The platform controls and adjusts operation of the connected devices during the sexual activity based on sensors reading, direct voice commands (such as 'faster', 'stronger', etc.), involuntary voice recognition (such as pleasure sounds or lack of them) and users setup changes (actuators, keypads, etc.).

Multiple users: The platform can connect more than two users together. For example one leads and two follow. Another example is a chain of users, affecting each other (i.e. a 'loop' of users).

Erotic service interaction: A user or users, which have a sex toy, can be connected to the RSP/P. The platform detects a sex toy (for example dildo shaped and a vagina shaped devices) and pairs the device with the remote sensual protocol/platform. The RSP/P creates a connection with the erotic service provider's system, if approved by the user. The rest of the process is similar to connecting two users, except that the override and manual operations are performed by the erotic service provider, giving the RSP/P the flexibility to a human 'natural' interaction.

Erotic movie/game interface: In this method of operation, the erotic service provided is replaced with a pre-recorded interaction. In this case, the RSP/P will use its optimization power together with the biofeedback received by users watching an erotic movie or playing an erotic game.

Sex therapist interface: In this case, a therapist is given permission by a user or multiple users to have access to their RSP/P data. The therapist may manipulate the system to help the users achieve ultimate pleasure.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. A remote sensual server-device to connect a first entity to a second entity for a sexual activity by a plurality of connected-devices, comprising:

a) a detecting and pairing unit implemented by one or more processors to detect and pair said plurality of connected-devices with said remote sensual server-device;

b) identifying a device-communication protocol for each of the plurality of connected-devices;

c) a monitoring unit having monitoring-communication protocol implemented by one or more processors to monitor a bio-feedbacks of said first entity and said second entity from a plurality of monitoring means during said sexual activity;
d) a storing unit implemented by one or more processors to store said bio-feedbacks;
e) an analyzing unit implemented by one or more processors to analyze said bio-feedbacks;
f) an optimizing unit implemented by one or more processors to optimize said bio-feedbacks;
g) a translating unit implemented by one or more processors to translate said device-communication protocol and said monitoring-communication protocol into a generic protocol which functions said connected-devices;
h) a communicating unit implemented by one or more processors to communicate between said entities;
i) a commanding unit implemented by one or more processors to command said connected-devices;
j) a controlling and adjusting unit implemented by one or more processors to control and adjust operation of said connected-devices during said sexual activity, and
whereby said remote sensual server-device enables said entity to focus on pleasure which happens in the right side of the brain instead of logical thinking which happens in the left side of the brain to interfere with the pleasure.

2. The remote sensual server-device of claim 1, wherein said connected-devices are selected from the groups consisting of vibrators, sex toys, sex dolls, pleasure giving toys, sensors and actuators.

3. The remote sensual server-device of claim 1, wherein said entities are selected from the groups consisting of two users, a group of users; a user to recorded media, a user to interactive media, dating websites, virtual reality websites, a user to a therapist, and erotic call centers.

4. The remote sensual server-device of claim 1, wherein said monitoring means monitors motion, body temperature, sound, humidity, heartbeat, blood oxygen and blood pressure.

5. The remote sensual server-device of claim 1, wherein said controlling and adjusting unit further has voluntary inputs such as voice commands, pressure commands, push buttons, sliders and key pads to amplify or reduce a thrust according to said entity preferences.

6. The remote sensual server-device of claim 1, wherein said optimizing unit further has manually input option to optimize entities preferences prior to said sexual activity throughout a questionnaire into said platform.

7. The remote sensual server-device of claim 1, wherein said optimizing unit quantifies said bio-feedbacks into a plurality of parameters related to said connected devices such as frequency, patterns, and thrust.

8. The remote sensual server-device of claim 1, wherein said translating unit translates said bio-feedbacks into a generic protocol, which functions said connected-devices, such as increase in pleasure sounds increases the thrust amplitude or creates a different pattern for said connected-devices.

9. A method to connect a first entity to a second entity for a sexual activity by a plurality of connected devices and implemented by one or more processors, comprising:
a) detecting and pairing said plurality of connected-devices with a remote sensual server-device;
b) monitoring a set of bio-feedbacks of said first entity and said second entity from a plurality of monitoring means during said sexual activity;
c) storing said set of bio-feedbacks;
d) analyzing said set of bio-feedbacks;
e) optimizing said set of bio-feedbacks;
f) translating said set of bio-feedbacks into a generic protocol which functions said connected devices;
g) communicating between said entities;
h) commanding said connected devices;
i) controlling and adjusting said connected-devices during said sexual activity, and
whereby said remote sensual server-device enables said entity to focus on pleasure which happens in the right side of the brain instead of logical thinking which happens in the left side of the brain to interfere with the pleasure.

10. The method to connect a first entity to a second entity for a sexual activity of claim 9, wherein said connected-devices are selected from the groups consisting of vibrators, sex toys, sex dolls, pleasure giving toys, sensors and actuators.

11. The method to connect a first entity to a second entity for a sexual activity of claim 9, wherein said entities are selected from the groups consisting of two users, a group of users; a user to recorded media, a user to interactive media, dating websites, virtual reality websites, a user to a therapist, and erotic call centers.

12. The method to connect a first entity to a second entity for a sexual activity of claim 9, wherein said monitoring means monitors motion, body temperature, sound, humidity, heartbeat, blood oxygen and blood pressure.

13. The method to connect a first entity to a second entity for a sexual activity of claim 9, wherein said controlling and adjusting unit further has voluntary inputs such as voice commands, pressure commands, push buttons, sliders and key pads to amplify or reduce a thrust according to said entity preferences.

14. The method to connect a first entity to a second entity for a sexual activity of claim 9, wherein said optimizing unit further has manually input option to optimize entities preferences prior to said sexual activity throughout a questionnaire into said server-device.

15. The remote sensual server-device of claim 1, wherein said set of bio-feedbacks are selected from a group consisting of emotional-, sensual-, and sexual-bio-feedbacks.

16. The method to connect a first entity to a second entity for a sexual activity of claim 9, wherein said set of bio-feedbacks are selected from a group consisting of emotional-, sensual-, and sexual-bio-feedbacks.

* * * * *